(No Model.)

E. J. HAUCK.
SHAKER FOR MIXING DRINKS.

No. 300,867. Patented June 24, 1884.

WITNESSES:
William Miller
Chas. Wahlers

INVENTOR
Edward J. Hauck
BY
Van Santvoord & Hauff
ATTORNEYS

N. PETERS. Photo-Lithographer. Washington, D. C.

United States Patent Office.

EDWARD J. HAUCK, OF BROOKLYN, NEW YORK.

SHAKER FOR MIXING DRINKS.

SPECIFICATION forming part of Letters Patent No. 300,867, dated June 24, 1884.

Application filed May 15, 1884. (No model.)

*To all whom it may concern:*

Be it known that I, EDWARD J. HAUCK, a citizen of the United States, residing at Brooklyn, in the county of Kings and State of New York, have invented new and useful Improvements in Shakers for Mixing Drinks, of which the following is a specification.

This invention relates to a shaker for mixing drinks, which consists of a vessel, a cup constructed to fit in an inverted position closely over the mouth of the vessel, a strainer secured in the upper portion of said cup, a cap which fits closely over the strainer, and a vent for the escape of the air from the interior of the shaker. With the vent is combined a bent pipe, to prevent the liquid from the interior from escaping, and also to prevent the vent from becoming clogged.

Figure 1:
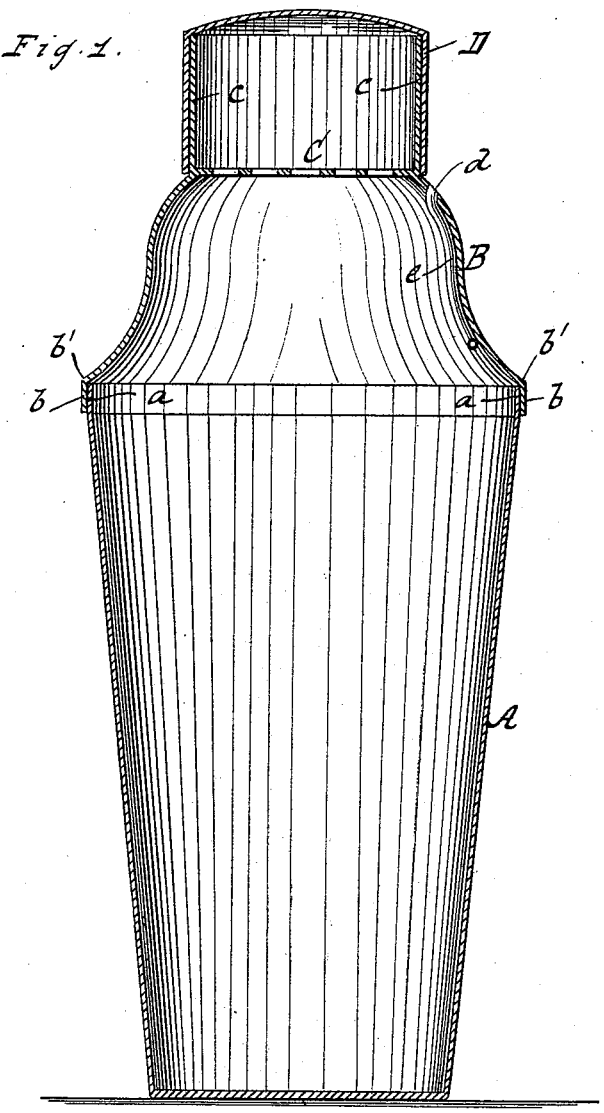
Figure 2:
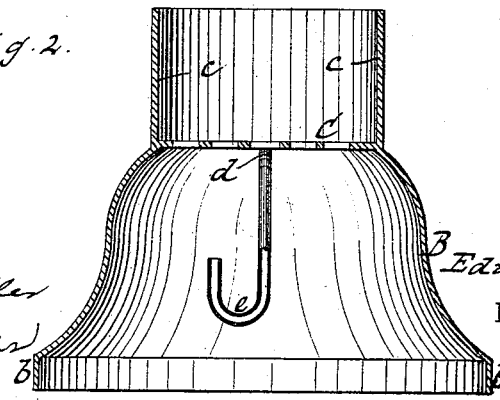

This invention is illustrated in the accompanying drawings, in which Figure 1 represents a vertical central section. Fig. 2 is a vertical section of the cup detached.

Similar letters indicate corresponding parts.

In the drawings the letter A designates a vessel, which may be made of metal, glass, or any other suitable material, and which is, by preference, made in the form of an ordinary tumbler, with that exception, however, that the upper portion, $a$, from the edge of the mouth downward to a distance of about half an inch, is cylindrical. With this vessel is combined a cup, B, which is, by preference, made of sheet metal, and which is bell-shaped and provided with a cylindrical rim, $b$, formed to fit closely over the cylindrical portion $a$ of the vessel A. Above this rim is a shoulder, $b'$, which prevents the cup from being forced down beyond the desired limit. In the upper part of the cup is secured a strainer, C, and above this strainer rises a cylindrical flange or rim, $c$, which fits closely into the cap D. When the cup B has been placed upon the vessel A and the cap D is pressed down over the flange $c$, the air in the interior of the shaker is compressed, and this pressure is still further increased if the ingredients contained in the shaker are liable to evolve gases during the mixing process. By the pressure of the air the cup and the cap are liable to be raised up, and the consequence is that the joints leak and a portion of the contents of the shaker is spilled over the counter. This difficulty I have avoided by providing the shaker with a vent, $d$, through which the surplus air can escape. In the example shown in the drawings the vent is formed in the cup B, but it may be formed in the cap D. With this vent is combined a pipe, $e$, the inner end of which is bent upward, as shown in Fig. 2. By this pipe the liquid contained in the shaker is prevented from squirting out during the mixing process, and the vent is not liable to become clogged up by leaves or other portions of the contents of the shaker.

I am aware that liquor-mixers consisting of two cups, the one so as to closely engage the other, have heretofore been used, and I do not claim, broadly, such a device.

What I claim as new, and desire to secure by Letters Patent, is—

1. The herein-described shaker for mixing drinks, consisting of the vessel A, the cup B, constructed to fit closely upon the vessel, the strainer C, secured in the upper portion of the cup, the cap D, fitting closely over the strainer, and the vent for the escape for the air from the interior of the shaker.

2. The combination, substantially as hereinbefore described, of the vessel A, with its cylindrical portion $a$, the cup B, with its cylindrical rim $b$, shoulder $b'$, and cylindrical flange $c$, the strainer C, the cap D, and the vent $d$.

3. The combination, substantially as hereinbefore described, of the vessel A, the cup B, constructed to fit closely upon the vessel, the strainer C, secured in the upper portion of the cup, the cap D, fitting closely over the strainer, the vent $d$, for the escape of the air from the interior of the shaker, and the bent pipe $e$.

In testimony whereof I have hereunto set my hand and seal in the presence of two subscribing witnesses.

EDWARD J. HAUCK. [L. S.]

Witnesses:
 WM. I. HAUCK,
 E. F. KASTENHUBER.